United States Patent [19]

Hirano et al.

[11] Patent Number: 5,054,986

[45] Date of Patent: * Oct. 8, 1991

[54] STORAGE AND CONVEYANCE OF HEAVY ARTICLES

[75] Inventors: Tadao Hirano, Tokorozawa; Hiroshi Yanagase, Tokyo, both of Japan

[73] Assignee: Tsubakimoto Chain Co., Japan

[ * ] Notice: The portion of the term of this patent subsequent to Nov. 20, 2007 has been disclaimed.

[21] Appl. No.: 511,980

[22] Filed: Apr. 23, 1990

Related U.S. Application Data

[63] Continuation of Ser. No. 241,579, Sep. 8, 1988, abandoned.

[51] Int. Cl.$^5$ ............................................. B65G 65/02
[52] U.S. Cl. ............................. 414/282; 104/137; 414/284; 414/341; 414/911
[58] Field of Search ............... 414/277, 279, 280–282, 414/284, 341, 343, 345, 911; 104/137; 105/177

[56] References Cited

U.S. PATENT DOCUMENTS

| 679,567 | 7/1901 | Lowe | 414/343 |
|---|---|---|---|
| 3,108,077 | 1/1973 | Richens et al. | 414/279 |
| 3,738,506 | 6/1973 | Cornford et al. | 414/279 X |
| 3,746,189 | 7/1973 | Busch et al. | 414/284 X |
| 3,805,973 | 4/1974 | Thompson | 414/284 |
| 3,978,995 | 9/1976 | Zollinger et al. | 414/279 |
| 4,252,217 | 2/1981 | Benjamin | 414/284 X |
| 4,459,078 | 7/1984 | Chiantella et al. | 414/284 X |
| 4,971,508 | 11/1990 | Miyahara et al. | 414/282 |

FOREIGN PATENT DOCUMENTS

| 821175 | 7/1949 | Fed. Rep. of Germany | 414/343 |
|---|---|---|---|
| 2452561 | 6/1975 | Fed. Rep. of Germany | 414/277 |
| 49576 | 4/1977 | Japan | 414/279 |
| 44417 | 3/1980 | Japan | 414/284 |
| 34506 | 3/1986 | Japan | 414/277 |
| 9847 | 1/1987 | Japan | 414/280 |
| 144826 | 9/1987 | Japan | 414/277 |
| 114792 | 4/1918 | United Kingdom | 414/343 |

Primary Examiner—David A. Bucci
Attorney, Agent, or Firm—Howson & Howson

[57] ABSTRACT

Heavy articles such as metal coils are transferred to and from storage locations in a storage area by a system of tracks and carriages including non-powered carriages which transport the articles directly and self-propelled carriages which move perpendicularly to the direction of movement of the non-powered carriages. The non-powered carriages are moved off and onto the self-propelled carriages by feeders carried by the self-propelled carriages. In one form of the invention, the above-mentioned self-propelled carriages are transferred to and from tracks in a parallel track array by an additional self-propelled carriage movable along a track extending perpendicular to the tracks of the parallel track array.

8 Claims, 5 Drawing Sheets

:04

STORAGE AND CONVEYANCE OF HEAVY ARTICLES

CROSS REFERENCE TO RELATED APPLICATIONS

This is a continuation of our co-pending application, Ser. No. 241,579, filed Sept. 8, 1988, now abandoned.

FIELD OF INVENTION

This invention relates to the storage and conveyance of heavy articles such as metal coils. The invention has utility in iron works and in other facilities where heavy articles must be moved about.

PRIOR ART AND ITS PROBLEMS

Conventionally, metal coils in iron works are moved about by means of cranes used in combination with various conveyors, walking beams and carriages, etc.. Consequently, lifting equipment for loading and unloading the metal coils must be constructed on a very large scale.

Furthermore, such coils have hitherto been stored on coil skids provided on the floor. Where skids used to hold oiled metal coils are to be used subsequently with non-oiled coils, their surfaces must first be cleaned, or alternatively, mats may be set out for protection of the non-oiled coils.

SUMMARY OF INVENTION

The present invention is firstly a storage and conveyance system for heavy articles comprising a first, non-powered, carriage movable with a heavy article supported on it; and a second, self-propelled, carriage arranged to travel in a direction perpendicular to the direction the movement of the first carriage and having means thereon for supporting the first carriage.

The present invention is secondly a system further comprising a third, self-propelled, carriage arranged to travel in a direction perpendicular to the direction of travel of the second carriage, and having means thereon for supporting the second carriage.

The present invention is thirdly a rail-carrying carriage comprising short rails for supporting an article-carrying carriage which in turn carries a heavy article thereon; and a feeder mechanism capable of transferring said article-carrying carriage between said short rails and external rails, wherein said rail-carrying carriage effects transfer of said article-carrying carriage at the position where said short rails and external rails align with each other, and said rail-carrying carriage is adapted to travel in a direction perpendicular to the direction of travel of said article-carrying carriage.

In one embodiment, a plurality of parallel running paths for the second carriages are provided in a storage site for heavy articles and arranged relative to a transverse running path for third carriages in such a way that one end of each parallel running path meets the transverse running path. Short external rails for storing the first carriages, which serve a pallets, may be provided along both sides of the running paths of the second carriages. A second carriage can be transferred from a third carriage to any selected one of its parallel running paths. A first carriage can then move sidewardly from the second carriage for storage and retrieval of articles. Storage and retrieval are effected by means of the feeder mechanism mounted on the second carriage. By combining the movement of the second carriages and the transverse movement of the third carriages carrying the second carriages, heavy articles may be transported into and out of the storage site selectively with high efficiency.

While a third carriage is transporting second and first carriages thereon, other second carriages may effect storage and/or retrieval of first carriages which support heavy articles.

Alternatively, the system may comprise only the first and second carriages, with a turntable used, instead of a third carriage, to switch the second carriages from one running path to another or to change the direction of travel of the second carriage.

DETAILED DESCRIPTION

Figure 4:
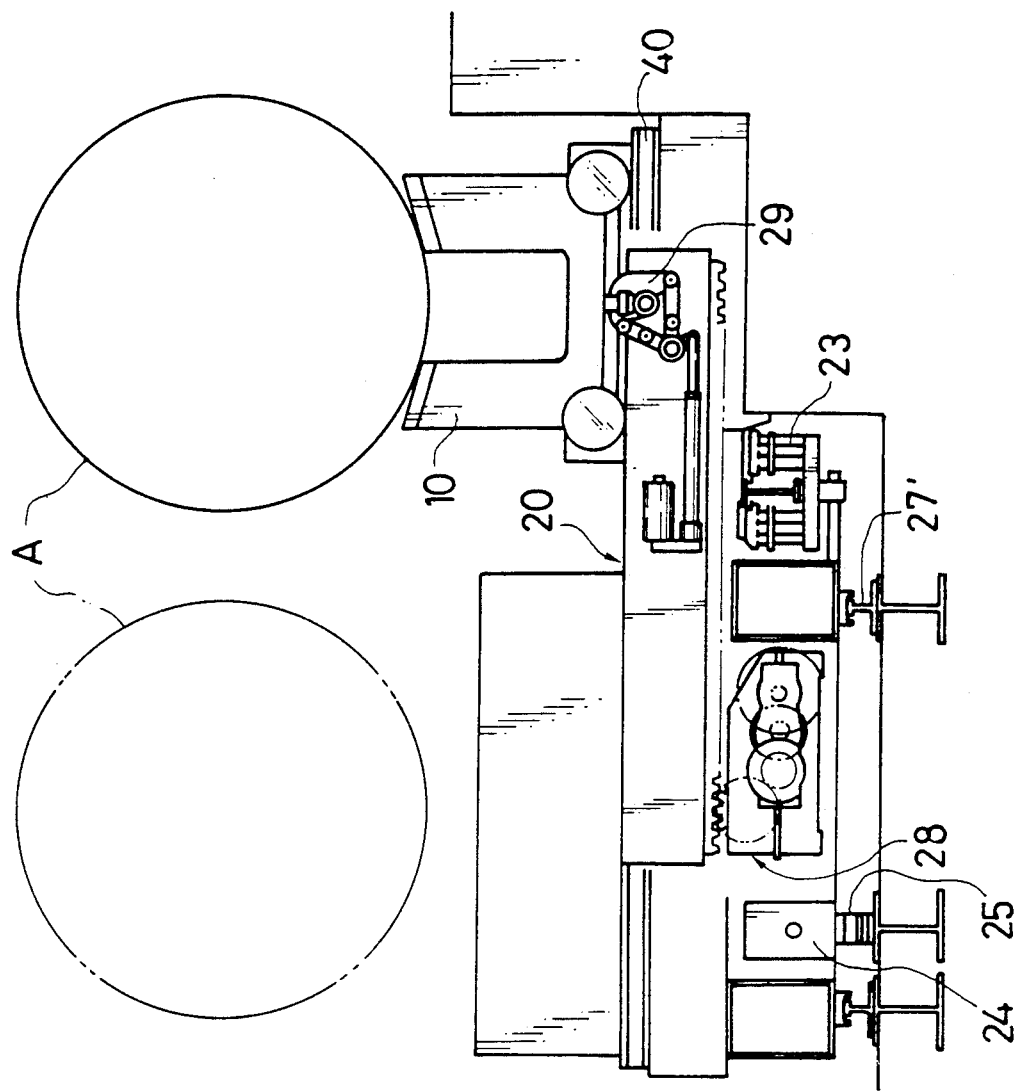
FIG. 4 is a side view thereof.
Figure 5:
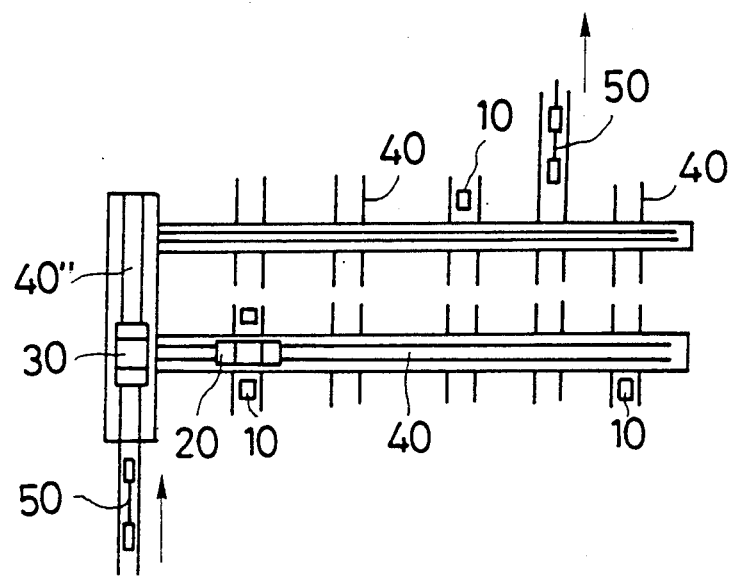
FIGS. 5 and 6 are plans showing examples of lay-out of the storage and conveyance equipment according to the present invention.

A first carriage or pallet 10 is a non-powered carriage for carrying a coil A, and is adapted to be moved on a short two-rail track 27 by a feeder 28 (see FIGS. 2 and 4) or a buffer/storage conveyor 50 (see FIG. 5).

A self-propelled second carriage 20 is powered by electric motor 21 and adapted to run on two-rail track 40' in a direction perpendicular to the direction of travel of the first carriage 10. Carriage 20 is equipped with a control board 22 which receives electric power and control signals through a collecting device 23 (see FIGS. 2 and 4).

A clamping device 24, operated by actuator 24', is provided for the accurate positioning of the second carriage 20. A protrusion located near the track is gripped when an actuator 24' is operated.

A sensor 26 is provided for controlling the speed of the second carriage 20.

Short two-rail track 27 is provided for carrying the first carriage 10 on top of the second carriage 20. Short track 27 is adapted to become aligned with external two-rail track 40 at the positions where the second carriage 20 stops. The external track 40 is provided for storing the first carriages with heavy articles thereon.

A feeding device 28 is mounted on the second carriage 20 for transferring the first carriage 10 onto or off the second carriage 20. The feeding device is moved to and fro by means of an electrically operated rack and pinion mechanism.

Reference numeral 29 denotes an engagement mechanism for moving the first carriage 10. This engagement mechanism is mounted at one end of feeder 28, and is opened or closed by means of an actuator 41 to grip a protrusion 42 provided on the first carriage 10. A similar engagement mechanism 43 may be provided on the other side of the carriage depending on the particular lay-out of the storage site. The above-mentioned feeder mechanism may be omitted if the first carriages 10 are moved by means of an externally operated feeding apparatus (not shown).

A clamping device 29' is provided on the second carriage 20 to fix the first carriage 10 stably on the second carriage, and is operated in a manner similar to the above-described clamping devices.

Electrical interlocking is preferably provided to ensure the proper operations of the above-mentioned various means and devices. Furthermore, speed control is preferably effected by means of an inverter in order to start and stop the carriages smoothly.

A third (traversing) carriage 30 is a self-propelled carriage running on two-rail track 40" in a direction perpendicular to the direction of travel of the second carriage 20. Carriage 30 is basically the same as the second carriage 20, and therefore a detailed description thereof may be dispensed with. Parts 21, 22, 24, 25 and 27 associated with carriage 20 have corresponding parts 31, 32, 34, 35 and 37 respectively, associated with carriage 30.

Figure 2:
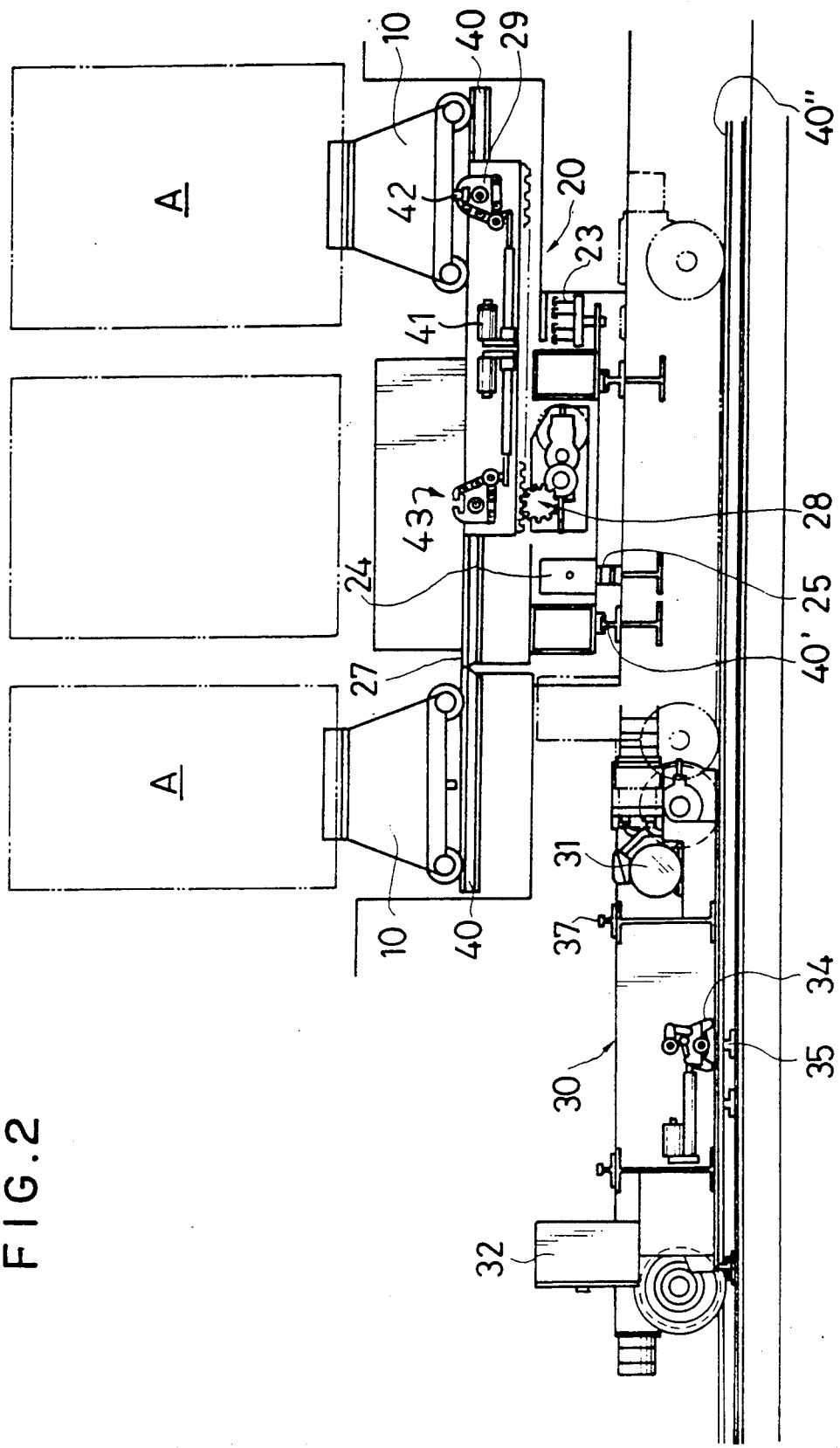
FIG. 2 is a side view thereof.

The right hand side of FIG. 2 illustrates the second carriage 20 running on the rail 40. When it becomes necessary to transfer a second carriage 20 to a third (traversing) carriage 30, the carriage 30 is stopped at the position where the corresponding tracks 37 and 40' become aligned, and the second carriage 20 is self-propelled onto third carriage 30.

Reference numeral 40 denotes a short external rail for storing one of the first carriages 10.

Figure 1:
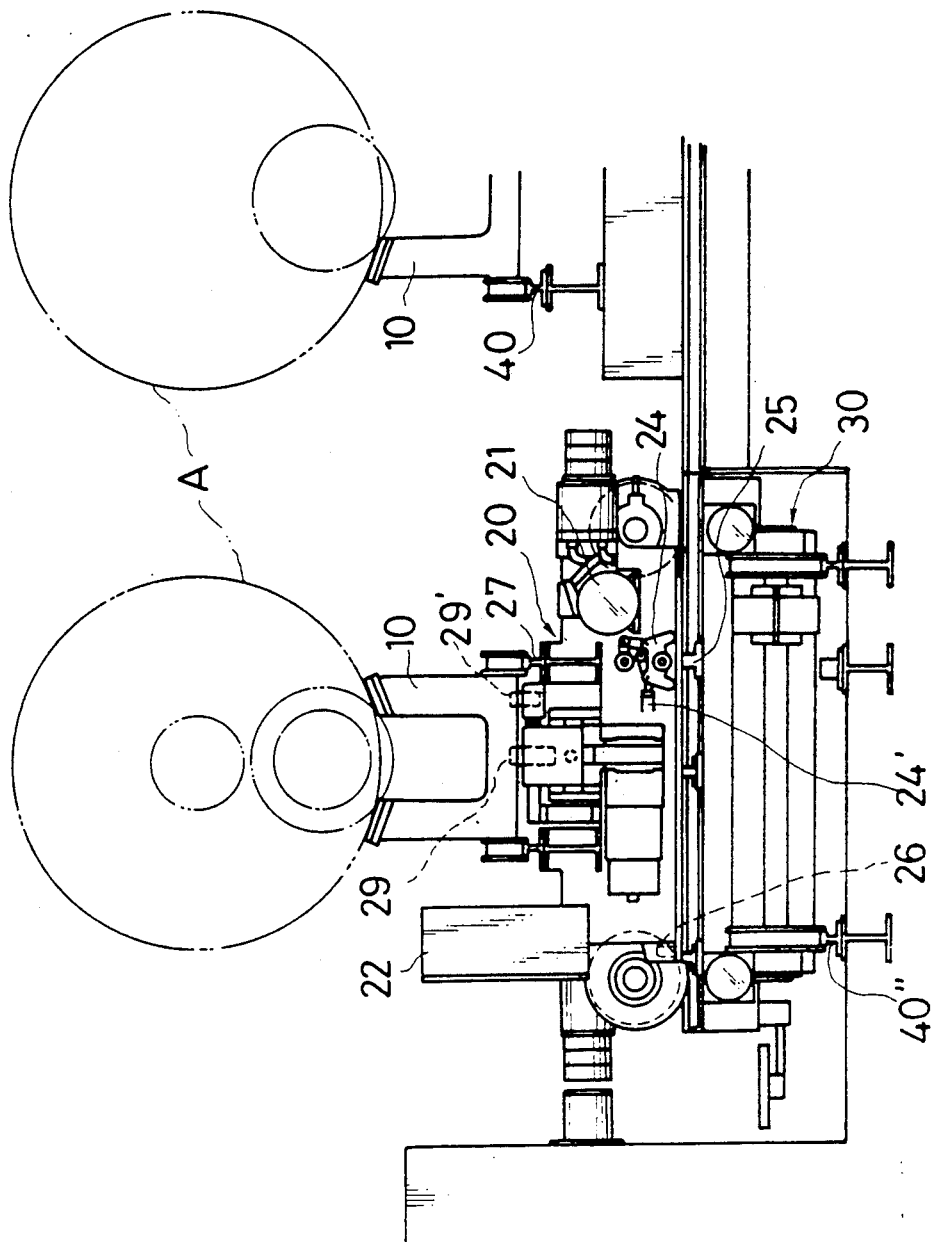
FIG. 1 is a front view of a first embodiment of the present invention.
Figure 3:
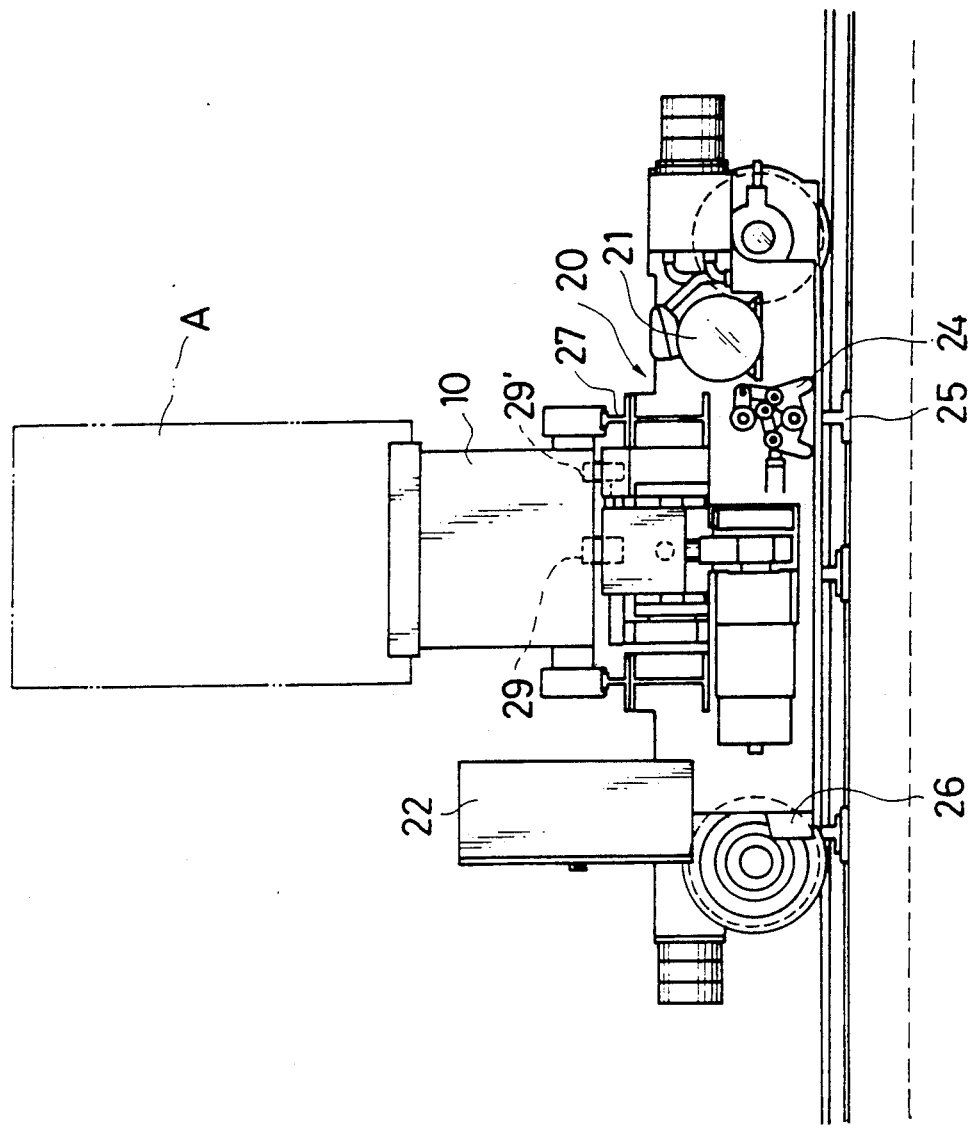
FIG. 3 is a front view of a second embodiment of the present invention.
Figure 6:
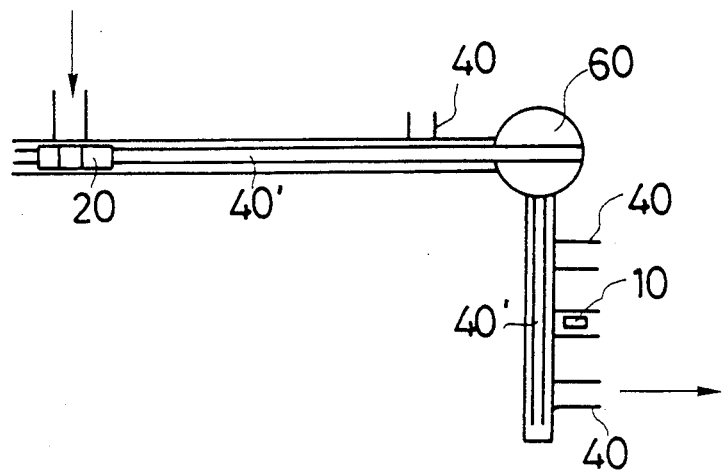

FIGS. 3, 4 and 6 show an embodiment in which only the first and second carriages are utilized, whereas, FIGS. 1, 2 and 5 illustrate an embodiment in which the third carriage is additionally utilized.

In FIGS. 5 and 6, which show examples of a storage site lay-out, reference numeral 50, in FIG. 5, is, for example, an external device, such as, a buffer/storage conveyor. Element 60 in FIG. 6 is a turntable used to switch second carriage 20 from one running path to another or to change the direction of travel of the second carriage 20.

As mentioned above, connection of rails may be easily effected, since the rails are to be connected perpendicularly with each other. Furthermore, the direction of the travel of the carriages may be changed easily by means of a turntable.

Among the advantages of the invention are the following:

(1) Since heavy articles, such as metal coils are conveyed on carriages, possible damage to the articles, which is likely to occur when they are transferred by cranes, is prevented.
(2) The conveyance system gives the user a high degree of freedom in establishing routing paths.
(3) When oiled coils and non-oiled coils are conveyed in the same system, adhesion of oil to the non-oiled coils may be easily prevented by placing oil-proof paper on the first carriages.
(4) Since lifting of heavy coils is not required, energy savings may be attained.
(5) The height of equipment is lower than that of conventional equipment using cranes. Consequently, the cost of construction is lower.
(6) Conveyance time may be shortened by running the self-propelled carriages at high speed.
(7) The use of a third carriage in addition to the first and second carriages improves the efficiency of transportation, since one or more second carriages are each capable of conveying a first carriage while a third carriage is transporting another set consisting of first and second carriages.

What is claimed is:

1. A storage and conveyance system for heavy articles comprising a plurality of elongated fixed, stationary tracks, a plurality of fixed, stationary storage tracks on both sides of each elongated track, the fixed, stationary storage tracks meeting the elongated tracks and extending perpendicularly therefrom, a first group of self-propelled, rail-carrying carriages movable along said elongated tracks, each of said self-propelled, rail-carrying carriages having a short track thereon selectably alignable with each of said storage tracks, a plurality of non-powered, article-carrying carriages situated on the tracks of said storage tracks, each of said article-carrying carriages having a heavy article carried thereon whereby each of the heavy articles stored in the system is held by an article-carrying carriage, each of said article-carrying carriages being arranged to be carried by said short track and movable from the storage track on which it is situated to said short track, and from said short track to any one of said storage tracks having space for an article-carrying carriage, when the short track is aligned therewith, and all of the article-carrying carriages in the system being situated at substantially the same level, feeder means for transferring said article-carrying carriages from said short track to said storage tracks and from said storage tracks to said short track, a third track met perpendicularly by said elongated, fixed stationary tracks, and an additional rail-carrying carriage situated on said third track and movable thereon, said additional carriage having rail means alignable with each of said elongated fixed, stationary tracks and adapted to receive and carry the self-propelled, rail-carrying carriages of said first group, whereby said third carriage is able to transfer carriages of the first group from each of the elongated, fixed, stationary tracks to another elongated, fixed, stationary track.

2. A storage and conveyance system according to claim 1 in which said feeder means includes means, carried by each of said rail-carrying carriages, for transferring an article-carrying carriage from the short track on the rail-carrying carriage to a storage track.

3. A storage and conveyance system according to claim 1 in which said feeder means includes means, carried by each of said rail-carrying carriages, for transferring an article-carrying carriage from the short track on the rail-carrying carriage to a storage track on either side of the elongated fixed, stationary track on which the rail-carrying carriage is situated.

4. A storage and conveyance system according to claim 3 in which the feeder means comprises a rack and pinion mechanism.

5. A storage and conveyance system according to claim 3 in which each of the article-carrying carriages includes a protrusion, and the feeder means of each rail-carrying carriage comprises means for gripping the protrusion, actuator means for engaging the gripping means with, and disengaging the gripping means from, a protrusion, and means for moving the gripping means laterally with respect to the direction of the track carrying the rail-carrying carriage, whereby the feeder means is able to effect lateral movement of the article-carrying carriage.

6. A storage and conveyance system according to claim 5 in which said means for moving the gripping means laterally is a rack and pinion mechanism, and in which said gripping means and actuator means are carried by the rack of said rack and pinion mechanism.

7. A storage and conveyance system according to claim 3 in which each of the article-carrying carriages includes a protrusion, and the feeder means of each rail-carrying carriage comprises a pair of gripping means, one for gripping the protrusion of an article-carrying carriage on one side of the elongated, fixed, stationary track carrying the rail-carrying carriage, and the other for gripping the protrusion of an article-carrying carriage on the other side of said elongated, fixed, stationary track, actuator means for each gripping means, for engaging the gripping means with, and disengaging the gripping means from, a protrusion, and means for moving the griping means laterally with respect to the direction of the track carrying the rail-carrying carriage, whereby the feeder means is able to effect lateral movement of an article-carrying carriage.

8. A storage and conveyance system according to claim 7 in which said means for moving the gripping means laterally is a rack and pinion mechanism, and in which said gripping means and actuator means are carried by the rack of said rack and pinion mechanism.

* * * * *